M. W. MIX.
AIRPLANE FUSELAGE.
APPLICATION FILED MAR. 28, 1918.
1,428,341. Patented Sept. 5, 1922.
3 SHEETS—SHEET 1.
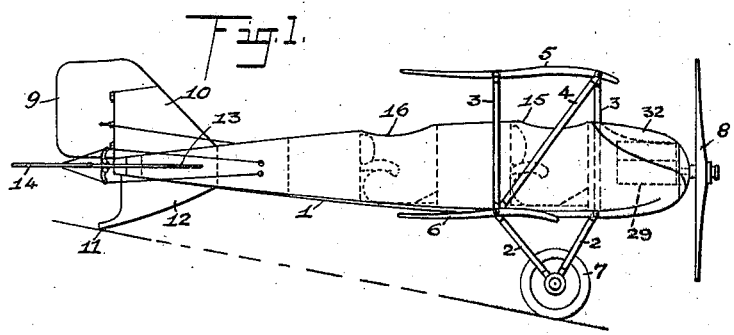
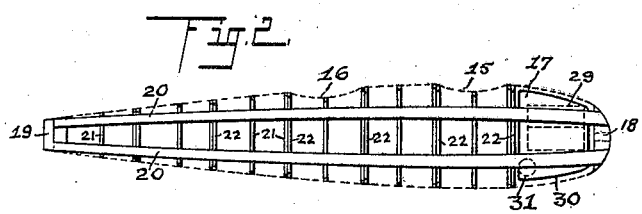
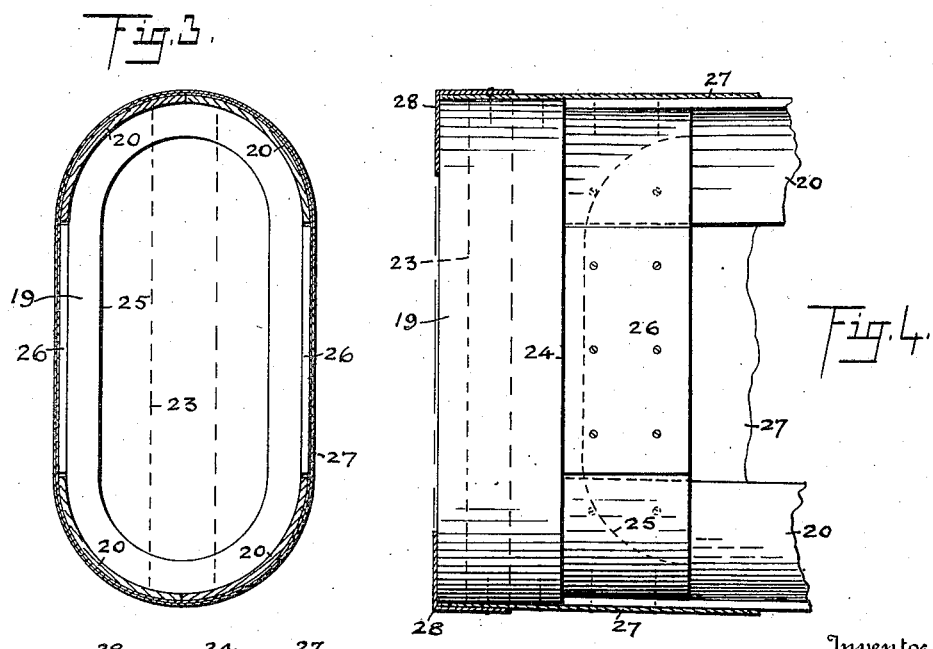
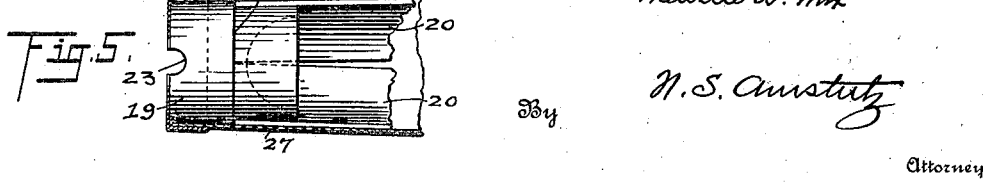
Inventor
Melville W. Mix
By H. S. Amstutz
Attorney

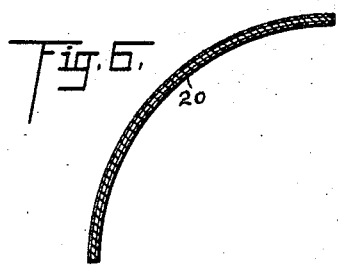
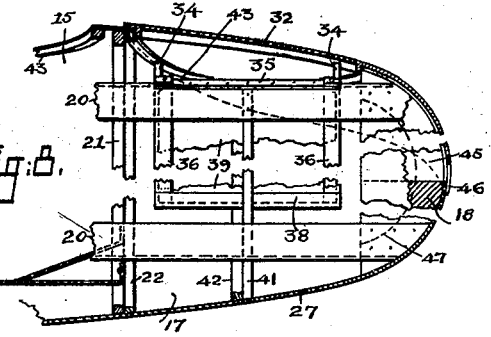
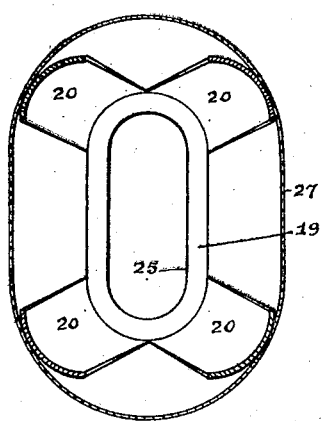
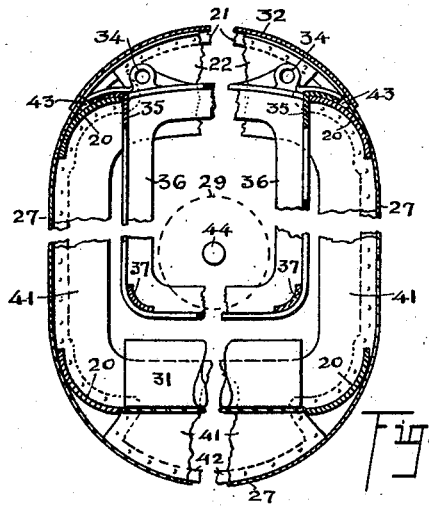
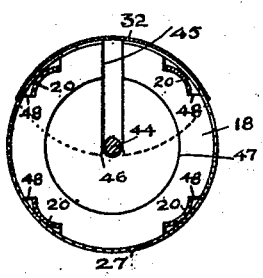
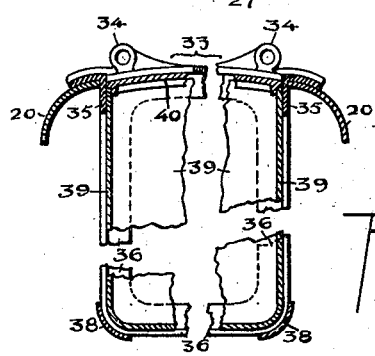

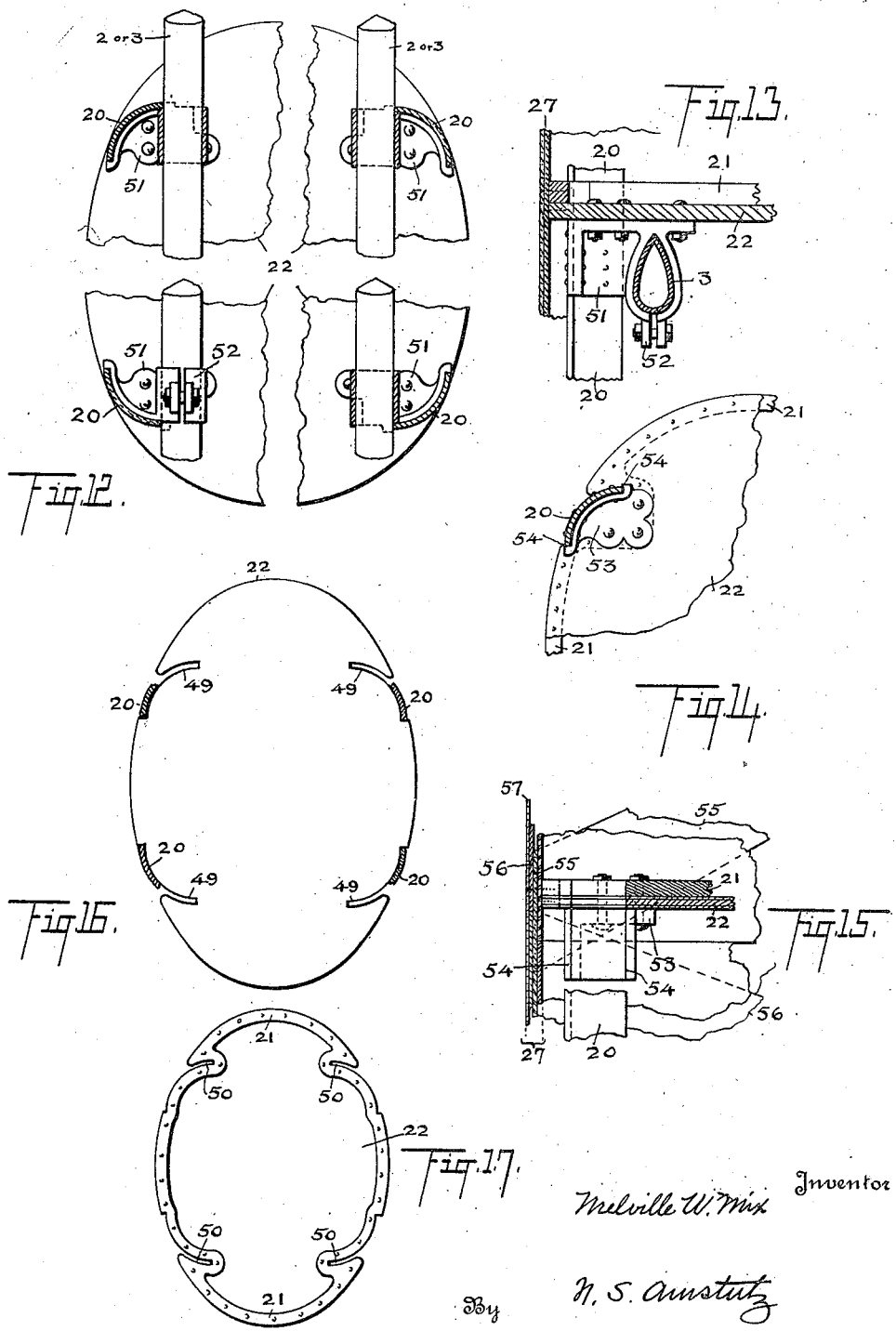

Patented Sept. 5, 1922.

1,428,341

UNITED STATES PATENT OFFICE.

MELVILLE W. MIX, OF MISHAWAKA, INDIANA.

AIRPLANE FUSELAGE.

Application filed March 28, 1918. Serial No. 225,237.

*To all whom it may concern:*

Be it known that I, MELVILLE W. MIX, citizen of the United States, residing at Mishawaka, in the county of St. Joseph and State of Indiana, have invented certain new and useful Improvements in Airplane Fuselages, of which the following is a specification.

My invention relates to improvements in airplane fuselages and it more especially consists of the features pointed out in the annexed claims.

The purpose is to provide an improved form of airplane fuselage of the monocoque type, that is extremely light in weight consistent with the stresses of extraordinary flight conditions; that along with a very light gross weight is very strongly built; that does not require special grades of rare materials in its construction; that readily lends itself to duplication in manufacture; that leaves a large margin or leeway of adaptation to designers of airplanes for special services; that provides continuous laminated longérons from stem to stern so as to form a structure in which the longérons are attached to a head piece and a tail or rudder post with intermediate frames and bulk heads secured to them wherever desired; that can be readily and quickly assembled; and that dispenses with a multiplicity of stay wires and their fastenings; that provides a removable engine cradle and metallic enclosed engine compartment; and that readily permits the construction in stream-line contour of minimum aerodynamic resistance.

With these and other purposes in view I illustrate in the accompanying drawings such instances of adaptation as will disclose the broad underlying features of the invention without limiting myself to the specific details shown.

Fig. 1 is a side elevation of an assembled airplane.

Fig. 2 is a side elevation of a skeletonized fuselage showing the continuous longérons, frames, bulk heads etc., and the stem and stern parts.

Fig. 3 is a detached inside elevation of the tail piece showing the attached longérons in section.

Fig. 4 is a side elevation of Fig. 3 showing the cooperating parts in assembled relation.

Fig. 5— is a top plan of Figs. 3 and 4 in reduced scale.

Fig. 6— is a detached cross section of a laminated longéron.

Fig. 7— is a cross section, looking astern of a group of receding longérons diagrammatically.

Fig. 8— is an elevation of the forward end of a fuselage, the parts being in broken relation to avoid dimensional limitations.

Fig. 9— is a transverse section of Fig. 8.

Fig. 10— is a transverse section directly in the rear of the stem piece.

Fig. 11— is a transverse section of an engine cradle and a metallic engine casing.

Fig. 12— is a transverse elevation of a bulk head with strut-longéron supporting brackets.

Fig. 13— is a plan view of a bracket portion of Fig. 12.

Fig. 14— is a fragmentary elevation of a bulk head longéron bracket.

Fig. 15— is a plan in section of Fig. 14 also showing related parts.

Fig. 16— is a detached elevation of a bulk head.

Fig. 17— is a detached elevation of a frame attached to a bulk head.

The salient feature of this invention lies in the use of laminated continuous longérons secured to stem and stern members regardless of the degree of curvature or shape given each one in cross section or the peculiar adaptations of bulk heads, frames, compartments etc., which may be varied to suit the exigencies of special type airplanes as desired without departing from the spirit of my invention. In carrying one adaptation of my invention into practice I may utilize the various expedients instanced in the drawings of any equivalents thereof.

Fuselages which embody my invention may be given any desired external contour, though ordinarily those of stream-line shape are found desirable. The body 1 shown in Fig. 1, comprises the longérons 20 that are attached to stem member 18 and stern member 19. Bulk heads 22 hold the longérons spaced apart and give transverse rigidity to the fuselage through the cooperating frames or ribs 21. Either 21 or 22 or both may be made up of laminated material. These frames 21 may be used alone or in groups as desired. Over the skeleton shown in Fig. 2 any desired form of outside covering 27 may be applied such as laminated sheets 55, Fig. 15, linen 57, thin aluminum or other metallic sheathing 56 arranged spirally or otherwise in single or multiple layers.

The fuselage 1 is provided with any desired type of engine that may be supported in removable cradles 29, Fig. 2 or 33, Figs. 8, 9 and 11. The engine shaft 44 Figs. 9 and 10 passes through the stem member 18 in any desired manner. To facilitate the removal of the engine without unshipping the propeller 8 a slot 45 may be formed in member 18 as exemplified in Figs. 8 and 10. Whenever the cradle 29 is to be removed "eye bolts" 34 serve to attach crane cable hooks.

Landing gear struts 2 are secured to the fuselage in whatever manner is found to be the most effective practical expedient. At their intersection, landing wheels 7 are placed with any desired form of shock absorbers between the wheel bearings and the strut sockets. Vertical wing struts 3 and diagonal struts 4 connect the upper wing 5 to the lower wing 6. At a point near the bottom of the fuselage struts 4 and 3 may be joined by sockets which also are attached to the mid spar of the lower wing 6. The upper end of struts 4 and 3 are attached to the rear and forward spars respectively of the upper wing 5. This specific arrangement of spars, struts, etc., is subject to multitudinous variations, since it is immaterial in what associative relation my improved fuselage is used, whether, biplane, monoplane, or any type of aero support that may be employed. The proportion of length to diameter exemplified in the drawings is suggestive only and is not to be construed as a limitation because these may also be varied ad libitum without departing from my basic type of composite structure.

The usual controls are of course associated with fuselages of this as well as any other type; such as a vertical stabilizer 10, a rudder 9, a tail skid 11, a tail skid fin 12, a horizontal stabilizer 13 and elevator 14. Separate compartments may be provided between the various bulkheads, or otherwise, one 17 for the engine, another 15 for the pilot, and another 16 for a passenger.

The more specific details of adaptation may be instanced by the following exemplifications without being limited to various expedients employed. The stern or rudder member 19 may have a rudder post groove 23 if the rudder constructions adapted demands the same. A recess 24 is formed around this member in a transverse direction to form a seat for the rear ends of the longérons 20 as shown in Figs. 3, 4 and 5. The stern rudder or tail member 19 may have a hollow 25 formed in the front face to reduce weight. Between the adjacent edges of the longérons which occur above each other fillers 26 may be placed in order that the covering 27 may have a substantially continuous surface to which it is attached. Instead of this expedient the recess 24 might be made to extend around the outer surface of member 19 only as far as a pair of longérons, top and bottom would require. To protect the rear edge of the covering 27 a continuous angular shaped collar 28 may be placed thereover or any other desired expedient used instead.

It will be observed that the curved cross section of the longérons 20 at the tail end of the fuselage meet in pairs at the top and bottom, each pair forming one-half of a complete circle. These longérons are laminated and formed to stimulate angle bars, but with an enlarged curvature, forming very rigid structural elements even when taken singly yet having a large factor of elasticity that makes them practically free from disruptive fracture. As they extend forward from the tail they may be spread apart in two directions to form the enlarged central portion of the fuselage. The extent of this separation is determined by the cross section the fuselage is to have at various points in its length determined by the bulkheads and frames. Toward the front end from the largest mid-section they again approach toward each other to approximate a stream line curve throughout their length. It is not absolutely essential that they preserve an exact quarter circle cross section throughout their length as the radius and length of the arc may be varied. It is also immaterial for the purpose of this exemplification and any practical adaptations thereof in what order the laminæ are grouped, whether all of one thickness or a thicker center between two thinner outer layers, etc.

In airplane structures it is of importance that the engine compartment 17 be isolated from the rest of the fuselage by means of a metallic lining to act as a safe-guard against fire, etc., this may include the entire compartment as shown at 30 in Fig. 2, or it may be supplemented or substituted by the casing 39 placed within the engine cradle 33 shown in Fig. 11. In the former case a gasoline tank 31 is also enclosed by the lining while in the latter case it is placed below the cradle 33 as shown in Fig. 9. A cover 32 may be placed over the engine compartment. This cover will also enclose the slot 45 of stem member 18. It may have a slot 46 adapted to pass over the engine shaft 44 as shown in Fig. 10.

The cradle 33 may be constructed in various ways among them may be exemplified the use of saddle angle 35 shown in Figs. 8, 9 and 11 that are attached to end frames 36 and which rest on the longérons 20. Corner angles 37 and 38 (Figs. 8, 9 and 11) serve to hold the lower ends of the frames 36 spaced apart. The detail means for fastening the engine to the cradle are not shown as they form no part of the present invention. The casing 39 may rest against angle bars 37 or 38 as desired and a separate cover 40 of this or any other type may be used if desired.

Immediately back of the engine compartment a solid bulkhead may be placed so as to separate it from the pilot's compartment or bulkhead 22 with the center portion removed as shown in Fig. 9 may be used. To reinforce the longérons 20 beneath the cradle "angle" 35 a special bulkhead 41 and frame 42 shown in Figs. 8 and 9 may be employed. This reinforcement is open at the top to permit the engine cradles 29 or 33 to be lowered into place. It reaches from upper to lower longérons and across from side to side beneath the engine as shown in Fig. 9. The edges of the compartment openings may be reinforced in any desired manner by members 43 or otherwise.

The longérons 20 rest in recesses 48 formed in stem member 18 as shown in Fig. 10 to which they may be secured by screws or otherwise. The stem 18 may be hollowed out at 47 to reduce weight. Each of the bulkheads 22 have curved slots 49 and the frames 21 have similar slots 50 in which the longérons 20 are seated. Where the struts 3 pass adjacent a bulkhead, an angle bracket 51 having a clamping portion 52 is used to secure the bulkhead, strut 3 and longérons to each other as instanced in Figs. 12 and 13 but wherever bulkheads and longérons alone are to be fastened to each other angle brackets 53 having abutting ledges 54 against which the edges of the longérons may rest are provided. The brackets 51 may also have similar ledges, both are shown in Figs. 12 to 15 inclusive.

The longérons 20 may also be fastened to the bulkheads by screws and the frames 21 wherever they occur independently of bulkheads will be secured to the longérons in a similar manner. These various details are recited as exemplifications only and not as limitations in structure because it is obvious that numerous alternatives for fastenings, etc., may be used. It will be apparent that a distinct advance in this art has been made through the use of features herein instanced.

What I claim is:

1. In airplane structures, a composite fuselage comprising continuous longérons that approximate a quarter circle in cross section, stem and stern members to which the longérons are attached, suitable distancing members placed between the end members in any desired relation so as to form a skeletonized interior, and a covering for the whole supported by the interior skeleton.

2. In airplane structures, a fuselage consisting of continuous laminated longérons, end members to which they are secured, internal supports between the end members serving to hold the longérons spaced apart, separate and independent compartments within the fuselage, and an engine supporting removable cradle in one compartment whereby the engine may be quickly and easily removed or inserted into the fuselage.

3. In airplane structures, a suitable fuselage, an engine compartment therefor, a detachable cradle to hold the engine, means for securing the cradle within said compartment, and a metallic casing to enclose the sides and bottom of the engine placed between the engine and the cradle.

4. A fuselage comprising various compartments, with suitable partitions therebetween, continuous laminated longérons of rounded angular cross section extending from end to end of the fuselage, means for attaching said longérons to the partitions, a detachable cradle adapted to support an engine, resting on a pair of the longérons, and a fire-proof casing for enclosing the engine attached to the cradle.

5. In airplane structures, a fuselage comprising a plurality of continuous laminated longérons of curved cross section, and members to which the longérons are secured, a plurality of transverse reinforcements placed between said members adapted to hold the longérons spaced apart, an engine, a shaft therefor, a propeller on the shaft, and means for supporting the engine to the rear of the forward end member and the propeller in front of the same with the shaft passing through a slotted opening in said member to admit of the bodily removal of the engine and attached propeller without unshipping the latter.

6. In airplane fuselages, a body comprising two pairs of laminated longérons extending continuously from end to end of the fuselage, said longérons in cross section being specially formed to approximate a right angle with a large curved portion joining the two extreme edges, partitions in the fuselage to divide the same into compartments, recesses formed in the edges of the partitions to approximate the cross sectional contour of the longérons, and means for securing said partitions.

7. In airplane structures, a fuselage comprising continuous laminated longérons of a curved cross section approximately a quarter-circle arranged in upper and lower pairs with each edge of each longéron projecting toward the companion edge of an adjoining longéron, transverse frames or ribs spaced apart to which the longérons are attached, recesses formed in the edges of said frames approximating the cross sectional contour of the longérons, means for securing the frames and longérons to each other, end members to close the fuselage, and a suitable covering over the entire body formed with openings as desired.

8. In airplane structures, a fuselage comprising a propeller at one end, flight control mechanism at the other end, wing structures between these, struts for securing the wings to the fuselage, a landing gear attached to certain of the struts, and means adapted to distribute the stresses set up by the propeller throughout the length of the fuselage such means comprising laminated longérons of curved cross section arranged in pairs with their curved portions extending outwardly.

9. In airplane structures, a fuselage comprising extreme end members, flight producing and control means placed beyond the end members, means for sustaining suspension attached to the fuselage between the other means, and longitudinal body parts secured to the end members whereby the stresses incurred in flight are distributed proportionally throughout the fuselage such parts comprising laminated longérons whose cross sectional contour approximates a quarter circle.

In testimony whereof I affix my signature.

MELVILLE W. MIX.